United States Patent [19]

Keller

[11] 4,311,359

[45] Jan. 19, 1982

[54] CONNECTING A LIGHT-CONDUCTING FIBER, FIBER BUNDLE, OR LIGHT PIPE TO A LIGHT-EMITTING OR LIGHT-RECEIVING ELEMENT

[75] Inventor: Gerhard Keller, Vaterstetten, Fed. Rep. of Germany

[73] Assignee: Schaltbau Gesellschaft mbH, Munich, Fed. Rep. of Germany

[21] Appl. No.: 124,972

[22] Filed: Feb. 27, 1980

[30] Foreign Application Priority Data

Feb. 28, 1979 [DE] Fed. Rep. of Germany ....... 2907705

[51] Int. Cl.³ .............................................. G02B 7/26
[52] U.S. Cl. .................................. 350/96.20; 250/227
[58] Field of Search ............... 350/96.15, 96.17, 96.20; 250/227; 357/17, 18, 30, 74; 339/124, 125 R, 128, 129, 228, 229, 248 S, 252 R, 273 S

[56] References Cited

U.S. PATENT DOCUMENTS

| 1,152,892 | 9/1915 | Henry | 339/252 R X |
| 3,497,923 | 3/1970 | Seckerson | 339/128 X |
| 4,081,208 | 3/1978 | Meade | 350/96.20 |
| 4,170,399 | 10/1979 | Hansen et al. | 350/96.20 |

Primary Examiner—John D. Lee
Attorney, Agent, or Firm—Smyth, Pavitt, Siegemund & Martella

[57] ABSTRACT

A connector, plug, or socket, for light-conducting fibers or fiber bundles includes a support element which is mounted upon a PC board and has a base aligned with and covering a light-receiving or light-emitting electric circuit element. A spring, or one leg of a spring, is mounted to extend above the base, and an aperture in the spring or leg will register therewith when deflected away from the bore. Upon release of the leg, a threaded-through fiber, or fiber bundle, is clamped and resiliently urged against the window of the circuit element.

6 Claims, 4 Drawing Figures

U.S. Patent    Jan. 19, 1982    4,311,359
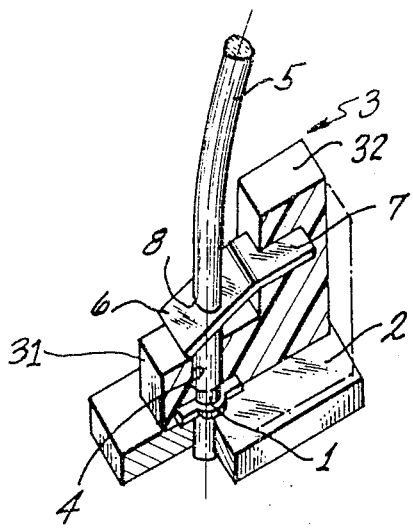
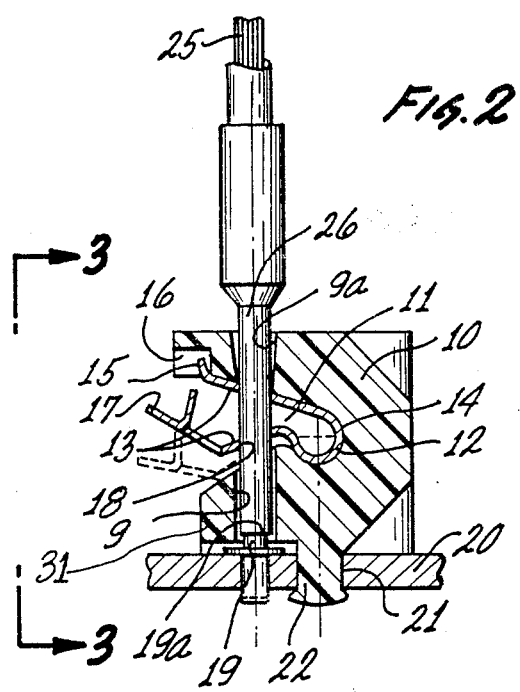
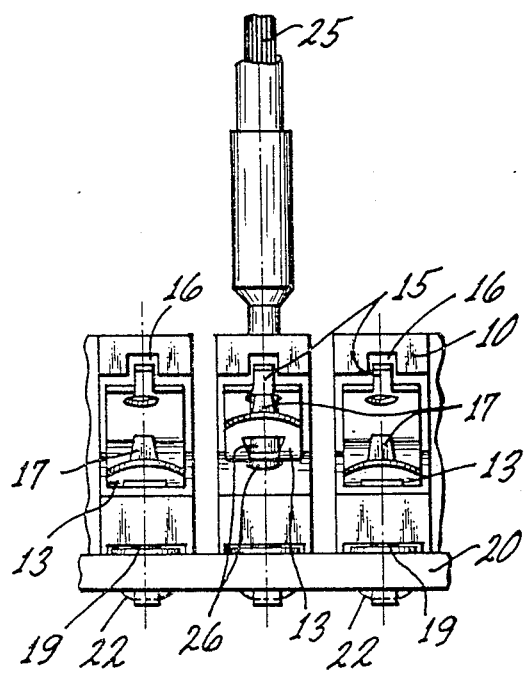
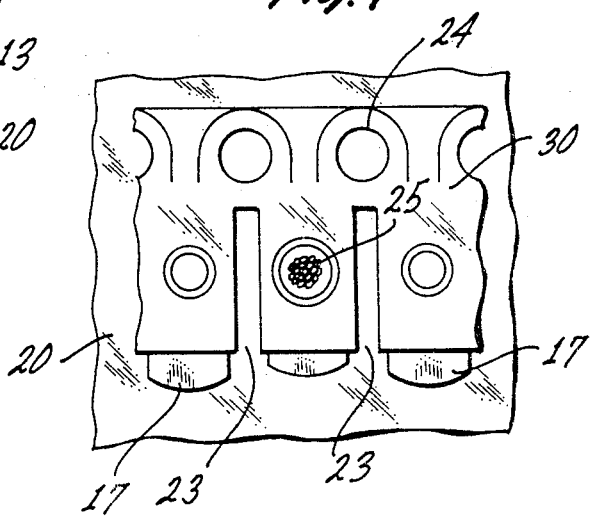

CONNECTING A LIGHT-CONDUCTING FIBER, FIBER BUNDLE, OR LIGHT PIPE TO A LIGHT-EMITTING OR LIGHT-RECEIVING ELEMENT

BACKGROUND OF THE INVENTION

The present invention relates to connecting a light-conducting filament, fiber, fiber bundle or light pipe to the entrance or exit window of a destination or source of light transmitted by and through the conductor.

Light-conducting fibers have been used for a variety of purposes, including the transmission of information over larger or smaller distances. Fiber optics is used more and more for transmitting signals and data in that manner within a system, such as a data processing system, or a control system in vehicles, in planes, in railroad engines, in machine tools, or even in sophisticated consumer appliances. Of particular interest here is the electrical isolation between electrical components being interconnected in that fashion.

In practice, these light-conducting fibers are interposed between spatially separated, electrical, printed circuit boards, one of them, e.g., including and supporting a light source among several threaded circuit elements on that board, and another board holding a light receiver. The light-conducting fibers are affixed and secured to that source and to that receiver. Plugs, connectors, and sockets for that purpose are, for example, of the variety as described in a paper published in "Elektronische Entwicklung," Volume 11, page 44 et seq.

The known connectors are disadvantaged by complications arising when components to which the fibers are to be connected have to be changed, exchanged (e.g., replaced because of defects, etc.). The plug-in type connection, as described on page 46, et seq. of the above-mentioned paper, requires integration of rather large socket parts in the printed circuit. This, in turn, encumbers the board as a whole. Moreover, such a board may be a general input/output board and may, therefore, accommodate several of such connections, obviously compounding the problem.

DESCRIPTION OF THE INVENTION

It is an object of the present invention to provide new and improved fittings, plugs, or socket-like elements for connecting light-conducting fibers, fiber bundles, a light pipe, or the like, to a light receiver or a light transmitter.

It is another object of the present invention to provide such a socket which is simple, and simple and inexpensive to make. Moreover, the connecting element is to be constructed in a way which permits easy and simple connection to and disconnection from the light-conducting fibers, etc. Furthermore, such a socket is to be as small as possible, to fit readily on a printed circuit board; several or even many of such sockets and connectors should be accommodated on such board without encumbering it.

It is a specific object of the present invention to provide a new and improved connection between a light-conducting element such as light-conducting fibers, a fiber bundle, a light pipe, or the like, and the window of a light-receiving or -emitting, electric circuit element.

In accordance with the preferred embodiment of the present invention, it is suggested to provide a support element, preferably made of an opaque material and having a bore to be aligned with the window of the circuit element as per the specific object. This circuit element is, for example, mounted on a PC board, and the support element is provided to be mounted thereto. A leaf spring is affixed to, or otherwise held on, the support element which leaf spring has an opening, aligning with the bore upon deflection of the spring. The light-conducting fiber, or fiber bundles, etc., are threaded through and, upon release of the spring, resilient reaction holds and clamps the light-conducting fiber, or fiber bundles, and retains the end thereof in the bore. Upon mounting the support element so that its bore is held above the circuit element, the fiber ends are urged into abutment with the window of that circuit element. Release of the fiber bundle merely requires that the spring be upwardly deflected, permitting easy pullout of the fibers. The fiber or fiber bundle is tightly held in the bore, a bundle may be encased in a flexible sleeve.

The best mode of practicing the invention provides for a V-shaped spring, one leg of the V being deflectible and deflected as stated. The V-shaped spring is snapped into a V-shaped opening or slot of the support element and is suitably held therein. This support element has two aligned bores, one facing the light-receiving or -emitting element, the other one providing for initial threading-through and supplemental holding functions for the fiber, or fiber bundles.

DESCRIPTION OF THE DRAWINGS

While the specification concludes with claims, particularly pointing out and distinctly claiming the subject matter which is regarded as the invention, it is believed that the invention, the objects and features of the invention, and further objects, features, and advantages thereof, will be better understood from the following description taken in connection with the accompanying drawings, in which:

FIG. 1 shows a perspective view, partially in section, of a connector or socket in accordance with the preferred embodiment of the invention;

FIG. 2 shows a cross-section through a connector or socket for practicing the best mode of the invention;

FIG. 3 shows a side elevation as indicated by line 3—3 in FIG. 2; and

FIG. 4 shows a top elevation of a device slightly modified and representing a variation of the best mode of practicing the invention.

Proceeding now to the detailed description of the drawings, FIG. 1 illustrates a printed circuit board 2 of which only a very small portion is shown. Several, even many, circuit elements are mounted on that board, among them an electronic device 1 which may emit, i.e. transmit, or receive light through a window. This light passes through a light-conducting fiber or fiber bundle 5, the light being destined for, or having been transmitted by, a suitable circuit element on another PC board.

Light-conducting fiber or fiber bundle 5 is connected to and held on the window of part 1 by means of a connector, socket, or fitting. This socket or fiber holder includes a support element 3, being shown partially in section; but the dash-dot phantom lines delineate the outer contour of the cut-off portion of the support element. Support element 3 has a bottom part 31 by means of which it sits on board 2 and is suitably fastened thereto. A post or stem 32 extends upright from bottom 31; together, parts 31 and 32 provide an L-shaped configuration of the support element.

The bottom part 31 is traversed by a bore 4 which tightly receives an end portion of the light-conducting fiber, or fiber bundle, 5 and holds it in form-closed relationship. The front end proper of fiber or fiber bundle 5 sits directly on the window of circuit element 1; element 1 projects into bore 4 from the other end and is accordingly covered by the bore. Stem 32 of support element 3 is provided with a slot 7 receiving one end of a cantilevered leaf spring 6. The free end of that spring extends above part 31 and, particularly, above the opening leading into bore 4. The free end of that spring is angled down and has an opening 8. This opening 8 will be vertically aligned with bore 4 when the spring is bent up a little.

Round opening 8 permits passage and threading-through of the light-conducting fiber, or fiber bundle, 5 and, upon deflecting spring 6 for aligning its opening 8 with bore 4, the light-conducting fiber or fiber bundle can be oriented directly in a vertical position. Fiber, or fiber bundle, 5 is pushed through the bore until its front end sits directly on the window of circuit element 1. Upon releasing spring 6, the sides of perforation 8 clamp the fiber or fiber bundle 5 and urge it down. In fact, the down-displacement of the spring is very small, and the fiber bundle or light pipe 5 is securely held and urged by the spring into abutment with the window of element 1. The fiber or fiber bundle 5 is easily released by bending spring 6 up and pulling the light-conducting device 5 out of opening 8 and bore 4.

FIGS. 2, 3, and 4 illustrate a printed circuit board 20, carrying an element 19 having a front window 19a and being inserted in an opening in the board. Board 20 has an opening 21 next to element 19, receiving a snap in type stem 22 which projects from the bottom of a support element 10, made, e.g., of a polyamid which is opaque.

Element 10 in FIG. 2 has a V-shaped slot 11; but the bottom of that slot is extended and contoured as a pocket 12 of circular cross-section, there being a construction between the main part of the V and pocket 12. A spring 13 is inserted into the slot; the spring has two legs extending from a curved portion 14 which will lodge in pocket 12. The spring legs also define a V which may have a larger apex angle than the V of slot 11 so that normally the spring legs abut resiliently the side walls of slot 11 defining the V.

A recess 16 in element 10 adjacent to the upper outer end of the slot receives a bent-off portion 15 of the spring. The spring, thus, snaps right into slot 11 and will be held securely upon insertion of part 14 into pocket 12 while the spring arms bear against the walls of slot 11 and lug 15 rests against the rear wall of recess 16.

Element 10 is provided with two vertically aligned bores 9 and 9a, defining an axis which traverses slot 11. The upper bore, 9a, is slightly tapered to facilitate threading of a bundle 25 of light-conducting fibers, for insertion in the lower bore 9. The light-conducting fiber, or fiber bundle, is jacketed but carries also a protective, terminal sleeve 26. Circuit element 19 fits particularly into a bottom recess of support element 10 and may even project into bore 9. Thus, window 19a of circuit element 19 is well protected and surrounded by opaque material.

The lower leg of spring 13 is provided with a bore 18 which will axially align with bores 9 and 9a if this spring leg is lifted to the illustrated position. Lifting is facilitated by a handle portion 17. The normal position of this spring leg is illustrated in a dashed line. "Normal" in this sense is to mean: without an inserted fiber bundle. The upper leg of spring 13 is also provided with a bore, but this bore registers with the bottom of bore 9a whenever the spring is inserted and that leg abuts the upper wall of V-shaped slot 11.

It can, thus, be seen that the particular fiber bundle 25 is fastened by threading it through bore 9a and the bore in the upper spring leg, lifting the lower leg of spring 13 until the fiber bundle with sleeve 26 is aligned with aperture 18 in that leg, whereupon fiber bundle 25 and sleeve 26 are threaded through aperture 9 until the front end of fiber bundle 25 abuts the window of element 19. Upon release of the lower leg of spring 13, sleeve 26 is clamped into position and urged against that window.

FIG. 3 illustrates three such sockets 10, in positions next to each other, on board 20. Only one of these connectors or sockets is shown to hold the end of a fiber bundle. The figure illustrates that conveniently many more of such sockets, light-conducting fiber bundles, and light-receiving and/or -emitting, electronic circuit elements 19 can be accommodated on the printed circuit board.

FIG. 4 shows a top view of a single support element 30 for accommodating three or more fiber bundles. This single support element 30, for a single connection socket, has notches 23 so that any desired number, including a single fiber bundle connector, can be easily cut off or otherwise separated from a long bar. FIG. 4 shows additionally that the support element can be fastened to PC board 20 by means of screws 24.

It can thus be seen that the device for holding and clamping a fiber bundle is of a simple construction and can be made very simply. In each instance, it consists of just two parts which, in the case of FIG. 2, are very easily put together. Portion 14 must merely be forced past the constriction between the main part of slot 11 and pocket 12, until portion 14 snaps into that pocket. Moreover, the fitting as a whole is quite small and can very easily be fastened to, and disconnected from, the respective PC board. Thus, replacement, for example, of a deteriorated circuit element 1 or 19 is quite simple and is not particularly encumbered by a complicated removal and replacement procedure of the connector and socket.

FIG. 4 illustrates in particular that large quantities of the sockets can, in varied numbers, be made especially simple. It is, of course, required here that the various circuit elements are mounted commensurate with the spacing of the group of integral sockets.

The invention is not limited to the embodiments described above; but all changes and modifications thereof, not constituting departures from the spirit and scope of the invention, are intended to be included.

I claim:

1. A connector socket for connecting the end of a light-conducting element, such as a light-conducting fiber or fiber bundle, to the window of a light-emitting or light-receiving circuit element on a carrier, or the like, such as a printed circuit board, comprising:

a support element provided for connection to the carrier adjacent to said circuit element, and having a bore for being situated above said circuit element, at least a portion of the bore having a diameter to match the diameter or outer dimensions of the light-conducting element, a leaf spring mounted to said support element, and having a leg being deflectible in at least a direction away from said bore, the leg extending above said bore; and a bore in the leg of the spring and being situated in the leg so that the bore of the spring leg is aligned with the bore in the support element upon deflecting the leg in said direction so that, following receiving the light-conducting element while deflected, the leg is provided to urge the light-conducting element toward said window of said circuit element, when the support element is affixed to the carrier and the window faces the bore in the support element.

2. A connector socket as in claim 1 and including means for connecting the socket to the carrier.

3. A connector socket as in claim 1, the socket being one of a plurality of similar, integral sockets, each including a support element and a leaf spring.

4. A connector socket as in claim 1, the support element having an essentially V-shaped slot, the support element having said bore and another bore in alignment therewith, said spring means having an essentially V-shaped configuration, and being resiliently retained in said slot, the spring means including further means for retaining the spring means in the slot, the spring means having two legs each one having a bore, these bores being aligned, upon inwardly deflecting one leg, with the two bores of the support element.

5. A connector socket as in claim 4, the bottom of the V-shaped slot having an enlarged portion, there being a constriction between the slot and the enlarged portion, the spring having a corresponding enlargement to be received by the enlarged portion of the slot, the enlarged portion of the slot and the spring enlargement constituting said means for retaining.

6. A connector socket as in claim 1, said support element being made of an opaque material.

* * * * *